United States Patent [19]

Smallegan et al.

[11] 4,384,667
[45] May 24, 1983

[54] FASTENER INSTALLATION TOOL AND BOLSTER ASSEMBLY

[75] Inventors: Jon M. Smallegan, Farmington Hills; Harold T. Woods; Dale H. Goodsmith, both of Livonia, all of Mich.

[73] Assignee: Multifastener Corporation, Mich.

[21] Appl. No.: 258,858

[22] Filed: Apr. 29, 1981

[51] Int. Cl.³ .......................... B21J 7/02; B23P 19/04
[52] U.S. Cl. ........................................ 227/2; 227/107; 29/584; 29/432.2; 29/798; 72/431; 100/53
[58] Field of Search .................. 29/432, 432.2, 520, 29/798; 72/22, 431, 432, 434; 74/581, 584, 585; 100/53, 99; 227/2, 5, 107, 130

[56] References Cited

U.S. PATENT DOCUMENTS

| | | | |
|---|---|---|---|
| 739,992 | 9/1903 | Davidson et al. | 74/581 X |
| 1,728,203 | 9/1929 | Clouse | 74/585 |
| 2,120,711 | 6/1938 | Phillips | 29/432 X |
| 2,796,253 | 6/1957 | Schulze et al. | 72/431 X |
| 2,856,999 | 10/1958 | Wilhelm | 72/434 X |
| 2,937,734 | 5/1960 | Sommer | 74/581 X |
| 3,098,576 | 7/1963 | Steward | 227/107 X |
| 3,152,628 | 10/1964 | Strain et al. | 29/798 |
| 3,583,201 | 6/1971 | Topaz | 72/432 |
| 3,718,965 | 3/1973 | Steward | 29/716 X |
| 3,726,000 | 4/1973 | Hafner | 29/432 |
| 3,791,191 | 2/1974 | Baldyga | 72/431 |
| 3,845,860 | 11/1974 | Ladouceur et al. | 29/412 X |
| 3,878,598 | 4/1975 | Steward | 29/432.2 |
| 3,930,248 | 12/1975 | Keller | 100/99 X |
| 3,946,478 | 3/1976 | Goodsmith et al. | 29/798 |
| 3,948,077 | 4/1976 | Bothe | 72/432 |
| 4,030,336 | 6/1977 | Grigorenko et al. | 72/432 |
| 4,096,798 | 6/1978 | Moskalik | 74/584 X |
| 4,202,433 | 5/1980 | Baltschun | 100/53 X |
| 4,320,707 | 3/1982 | McIlrath | 227/2 X |

Primary Examiner—Paul A. Bell
Attorney, Agent, or Firm—Cullen, Sloman, Cantor, Grauer, Scott & Rutherford

[57] ABSTRACT

The fastener installation head and bolster assembly of this invention is particularly adapted to assure constant installation pressure for fasteners installed in a reciprocating press die, such as pierce and clinch nuts. The fastener installation head includes a plunger supported on one die platen, a movable housing member which receives the fasteners to be installed, reciprocably supported on the plunger, and a die member supported on the opposed die platen, opposite the movable housing plunger passage. The bolster assembly includes a fluid pressure ram operably supporting the plunger between the plunger and the die platen having a source of constant fluid pressure and a plunger release which permits the plunger to recede when the press tonage exceeds the preferred fastener installation force.

12 Claims, 4 Drawing Figures

4,384,667

FASTENER INSTALLATION TOOL AND BOLSTER ASSEMBLY

FIELD OF THE INVENTION

A fastener installation head and bolster assembly located in a reciprocating press die having opposed platens, wherein the strength of the fastener assembly is sensitive to die pressure. It will be understood that the bolster assembly of this invention will be useful for various types of male and female fasteners which are installed in a press, however the disclosed embodiment will be limited to the installation of pierce and clinch nuts to simplify the disclosure.

Pierce and clinch nuts are presently used commercially to fasten various structural elements, such as automotive body panels and the like. The nut becomes an integral part of the work piece and several nuts may be installed simultaneously in a large press during the die forming of the work piece. The preferred fastener installation force is dependent upon the type of fastener, which determines the preferred mechanical interlock, and the panel material and thickness. The preferred fastener installation pressure is however dependent upon several factors, including the force required to form the desired contour in the work piece, the material strengths of the component parts, tolerances and wear of the press and installation head components. Tolerance build-up is a particular problem in a stacked nut installation head, where the nuts are stacked in the plunger passage and the plunger installs the bottom nut, as described below. These factors can not always be predicted or controlled, resulting in overhit and underhit conditions, which may be detrimental to the strength of the fastener assembly.

A pierce nut generally includes a projecting pilot portion which serves as a disposable punch to pierce the work piece and the nut simultaneously forms a mechanical interlock with the work piece, which retains the nut in the pierced opening. In an overhit condition, where the installation pressure is too great, the panel may be thinned out, reducing the push through strength of the assembly. In an underhit condition, where the installation force is less than preferred, the push out strength of the assembly may be reduced.

In a typical application, where pierce nuts are being installed in a large automotive press, the total force of the press may be fifty to one hundred tons. However, the preferred pierce nut installation force may be only six tons. An extreme overhit condition may thus damage or even break the fastener installation die or head. This problem is presently solved by adjusting the tonage of the press to a slight underhit condition. Once set, however, it is difficult to vary the force during successive cycles of the press.

This problem is solved by the bolster assembly of this invention by releasing the fastener installation plunger when the preferred fastener installation force is reached, thus permitting full installation pressure while avoiding an overhit condition.

SUMMARY OF THE INVENTION

As described above, the bolster assembly of this invention is particularly adapted to assure a constant fastener installation force in a reciprocal press die while avoiding overhit and underhit conditions. The fastener installation head is located in a reciprocal press die having opposed platens. The installation head includes an elongated plunger and a relatively movable housing member having a first passage receiving the fasteners to be installed and a second transverse passage receiving the plunger therethrough. The plunger is operably supported on one of the die platens and a fastener installation die member is supported on the opposed die platen, opposite the housing member plunger passage. The work piece is received between the die member and the housing member plunger passage.

As the press die is closed, the housing member first engages the work piece, stopping the relative movement of the housing member and the work piece. A fastener is then located in the plunger passage, beneath the plunger, ready for installation. Continued closing of the press die moves the plunger through the passage to engage the fastener, drive the fastener into the work piece and install the fastener.

The bolster assembly includes a fluid ram preferably located between the plunger and the supporting die platen. The fluid ram is generally coaxially aligned with and operably supports the plunger to maintain a constant installation pressure, as now described. It is also possible to support the fastener installation die member with the bolster assembly, wherein the die member collapses into the supporting platen. The following description is however limited to the preferred embodiment wherein the plunger is supported by the bolster assembly. A fluid pressure means maintains a constant predetermined pressure on the ram, which is the desired fastener installation pressure. A stop means limits the longitudinal movement of the plunger relative to the housing during the installation cycle and then interlocks the plunger and the housing when the plunger has extended through the housing member and installed a fastener in the work piece. Finally, a plunger release means releases the ram and the plunger when the pressure exceeds the preferred fastener installation force. The plunger and ram then recede in unison under constant pressure, avoiding an overhit condition. The plunger may be set to exceed the preferred installation pressure with each stroke of the press, avoiding underhit and overhit conditions, or the plunger may be set to normally install the fastener and recede only when the installation force exceeds a predetermined maximum. In the preferred embodiment, the ram is a pneumatic cylinder and the ram is forced into the pneumatic chamber 88 which provides the release means.

Other advantages and meritorious features of the fastener installation tool and bolster assembly of this invention will be more fully understood from the following description of the preferred embodiments, the appended claims and the drawings, a brief description of which follows.

DESCRIPTION OF THE PREFERRED EMBODIMENTS

Figure 1:
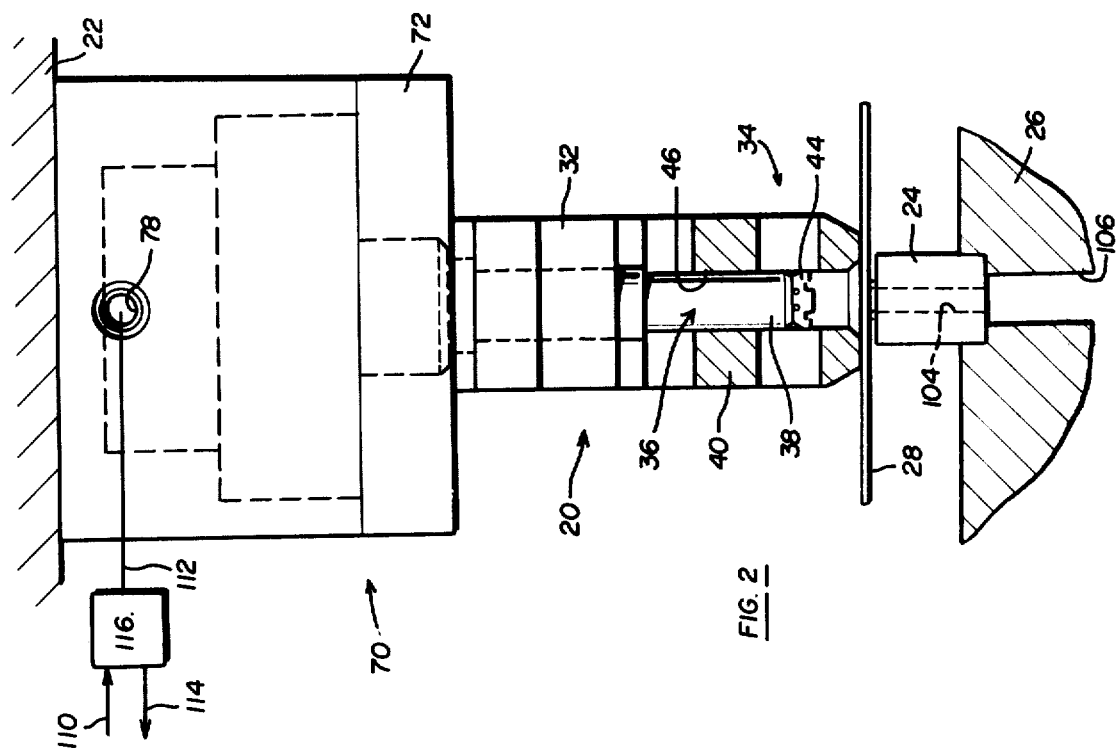
FIG. 1 is a side, partially cross-sectioned view of one embodiment of the fastener installation head and bolster assembly of this invention as the plunger engages a nut, ready for installation.

In the embodiment of the fastener installation head and bolster assembly shown in the drawings, the fastener installation head 20 is supported on an upper platen 22 of a reciprocable press, not shown. A fastener installation die member 24 is supported on the lower platen 26 of the press. The work piece 28 is supported on the die member 24 for installation of a fastener, such as a pierce nut. It is understood that the terms "upper" and "lower" are relative terms only and the die 24 may be supported on the upper die platen for an up-pierce operation. In either event, the press platens close by moving one die platen toward the opposed die platen or the die platens may move simultaneously into forming contact.

As described above, pierce nuts are presently installed in a reciprocating press capable of generating fifty to one hundred tons of die pressure, wherein the work piece is simultaneously formed into a desired contour, such as an automotive body panel or the like. The disclosed fastener installation head is adapted to install a fastener in the work piece 28 with each stroke or cycle of the press. The press die assembly may include a series of fastener installation heads, each installing a fastener with each stroke of the press.

The disclosed embodiment of the fastener installation head 20 includes an upper housing member 32 which is supported on the upper platen 22 and a lower housing member 34. The upper housing member includes a plunger 36 which is fixed relative to the upper housing member having a rectangular end portion 38 which is reciprocably received in the lower housing member as described below.

The lower housing member includes a nose piece 40 having a first passage 42 receiving pierce nuts for installation in the work piece and a second transverse plunger passage 46 which receives the end portion 38 of the plunger. The disclosed embodiment of the fastener installation head may be used to install rectangular pierce nuts, such as disclosed in U.S. Pat. No. 3,648,747 assigned to the assignee of the present application. The pierce nuts may be interconnected in a strip or coil by frangible connector means, such as disclosed in U.S. Pat. No. 3,845,860, also assigned to the assignee of the present application. The plunger passage 46 is therefore rectangular in the disclosed embodiment and closely receives the rectangular pierce nuts 44 and the rectangular end portion 38 of the plunger to avoid turning of the fasteners as the fasteners are received through the plunger passage, as described below.

The fasteners 44 are received in the nose piece passage 42 through a feeder tongue assembly 48, which is releasably interlocked to the nose piece by the guide post 50. The guide post 50 is reciprocably received in a cylindrical bore 54 in the upper housing member and the feeder tongue 48 is releasably interlocked with the guide post and nose piece by a spring loaded lock pin 56. The lock pin includes a reduced diameter end portion 52 which is received in an aperture in the feeder tongue assembly. A coil compression spring 58 is received in cylindrical aperture 66 in the guide post which engages an enlarged head portion of the lock pin 56 spring biasing the lock pin. A locator pin 60 slidably attaches the guide post 50 to the upper housing member. The locator pin is attached to the upper housing member by a clip 62 and the end of the pin is received in a key slot 64 in the guide post. The lower housing assembly is thus able to move relative to the upper housing assembly. The guide post 50 is slidably received in the cylindrical bore 54, guiding the lower housing assembly for reciprocal motion on the plunger 36.

The upper housing assembly is secured by threaded screws 68 to the mounting plate 72 of the bolster assembly 70. A mounting plate 74 is secured between the support base of the upper housing assembly 32 and the mounting plate 72 of the bolster assembly to prevent downward movement of the plunger 36, as described below. The mounting plate is secured to the cylinder manifold 76. The manifold includes an inlet port 78 and a pneumatic cylinder 82 located in a sealed chamber 84. In the disclosed embodiment, the pneumatic cylinder includes external threads 86 which are threadably received in the internally threaded cylindrical opening 80 in the chamber 84. The pneumatic cylinder is thus threadably secured in the manifold chamber to prevent axial movement.

A cylindrical gas chamber 88 is provided behind the pneumatic cylinder and the cylinder 82 includes an internal piston ram 90 having an enlarged piston head 92 exposed to the pressure chamber 88. The chamber 88 may thus be charged through inlet port 78, subjecting the ram 90 to a predetermined pressure.

As shown, the ram 90 is coaxially aligned with and engages the plunger 36 of the fastener installation head. The plunger includes an enlarged cylindrical portion 96 defining a shoulder 98 between the enlarged cylindrical portion 96 and the rectangular end portion 38. As described below, the shoulder 98 provides a stop means which interlocks the upper and lower housing members during installation of a fastener. The plunger also includes an enlarged cylindrical end portion 100 located in a cylindrical aperture in the back-up plate and engaging the upper end of the upper housing member, preventing downward movement of the plunger. The end of the ram 90 engages the enlarged end portion 100 of the plunger.

Figure 2:
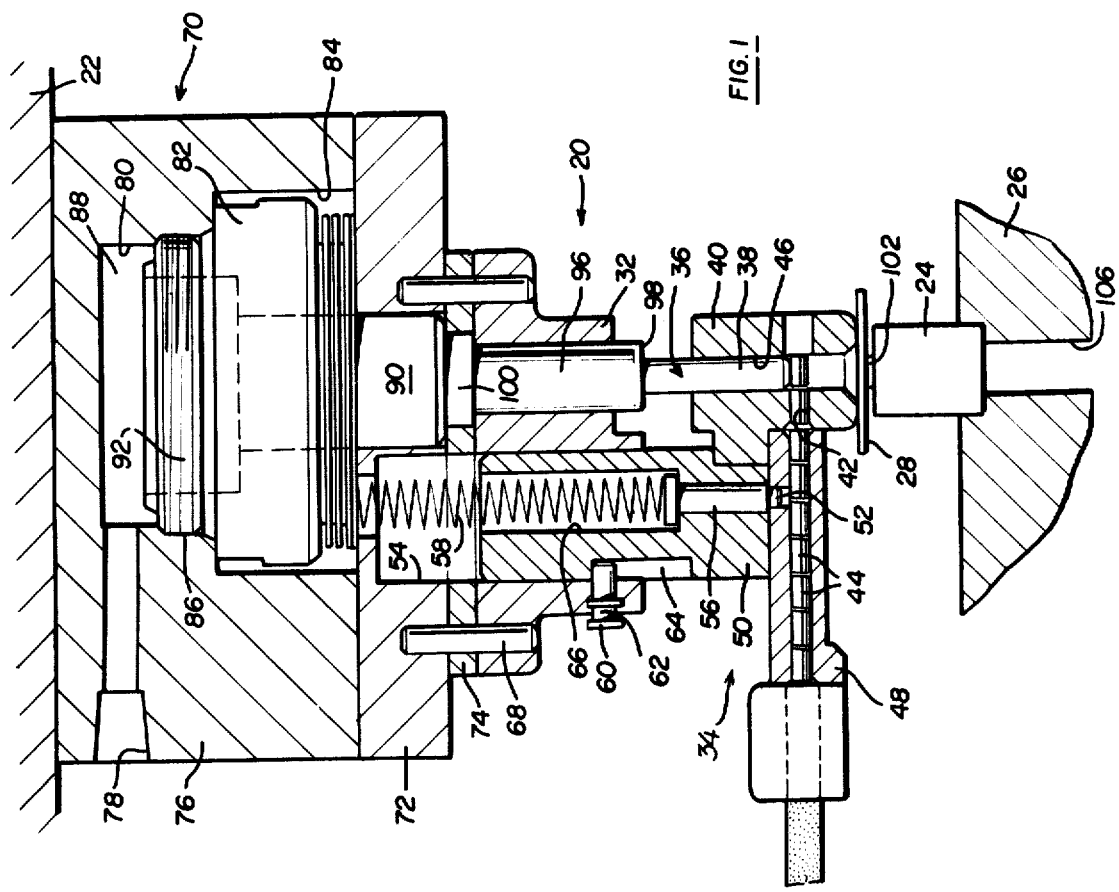
FIG. 2 is a partially cross-sectioned end view of the embodiment of the fastener installation head and bolster assembly shown in FIG. 1.

The general operation of the installation head is therefore as follows. As the press die is closed, the patens 22 and 26 are moved together. As described, the work piece 28 is located on the die member 24, opposite the plunger passage 46 of the lower housing member 34. The die member 24 includes upstanding ribs 102 which deform the panel into nut grooves and form an interlock between the nut and panel as the nut pierces the panel opening. The die member also includes a rectangular opening 104, as shown in FIG. 2. In the disclosed embodiment, the lower platen 26 also includes a counterbore 106 which receives the panel slug. As the press die is closed, the nose piece 40 of the lower housing first engages the work piece 28 as shown in FIGS. 1 and 2. The pierce nuts 44 in the disclosed embodiment are interconnected by frangible connector means, not shown, supporting the first nut beneath the plunger 38. The nuts may also be stacked in the plunger passage 46, beneath the plunger 36, such that the plunger installs the bottom nut of the stack with each cycle of the press. A stacked nut installation head is shown in U.S. Pat. No. 3,718,965, which is assigned to the Assignee of the instant application. A stacked nut installation head may have a problem with tolerance build-up, wherein deviations from the preferred pilot height may be accumulative, resulting in an overhit or underhit condition. The disclosed bolster assembly eliminates this problem, as described herein.

Figure 3:
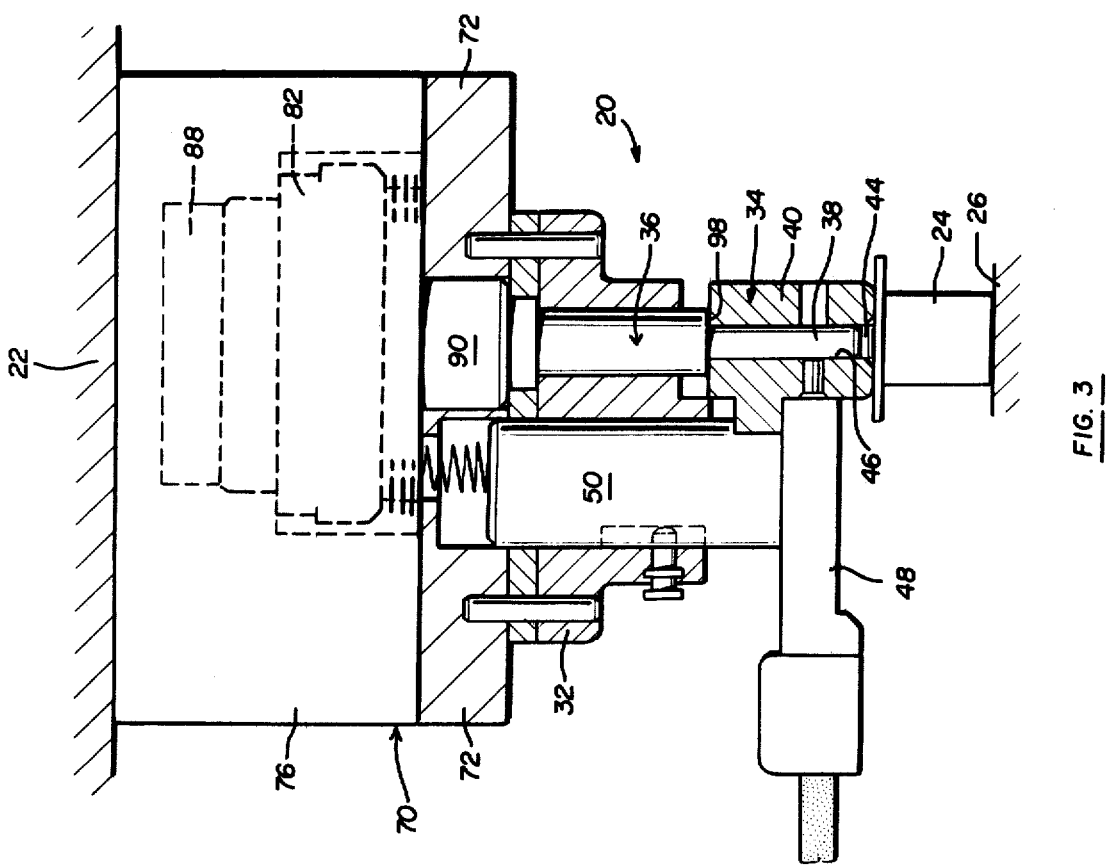
FIG. 3 is a partially cross-sectioned side view of the installation head and bolster assembly of FIG. 1 as the fastener is installed in the work piece.

Continued relative movement of the press platens moves the plunger 36 relative to the lower housing member, through passage 46, stripping the end pierce nut from the nut strip in the disclosed embodiment and finally installing the nut in the panel work piece 28, as shown in FIG. 3 and described in the above referenced United States Patents. Reference is also made to U.S. Pat. No. 3,098,576 which discloses a conventional pierce nut installation head and the method of installing pierce nuts. The disclosures of all of the above references are incorporated by reference. As shown in FIG. 3 of this application, the shoulder 98 of the plunger first engages the upper end of the nose piece 40, interlocking the upper and lower housing member and compressing the plunger 36 upwardly in FIG. 3.

Figure 4:
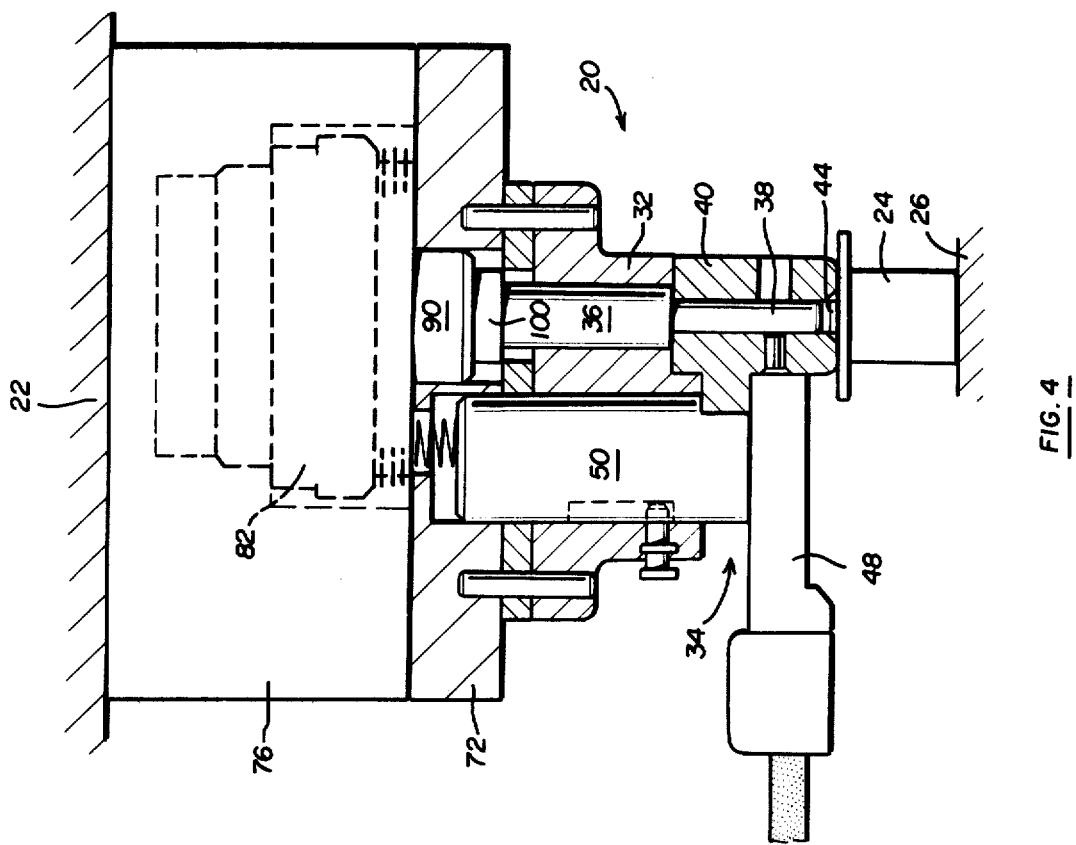
FIG. 4 is a partially cross-sectioned side view, similar to FIGS. 1 and 3, with the plunger and ram assembly fully recessed.

The fastener installation head and bolster assembly may be set for one of two alternative operations. First, the plunger may be set to assure an overhit condition on each cycle of the press. That is, the plunger will install the pierce nut 44, as shown in FIG. 3, and the force will then exceed the pressure in chamber 88. The ram 90 of the pneumatic cylinder will thus be forced upwardly, as shown in FIG. 4, maintaining a predetermined desired installation force. This method avoids an underhit condition as the installation force is always met. Further, the bolster assembly avoids an overhit condition as the plunger 34 is released upwardly when the pressure reaches the predetermined maximum pressure available from the pneumatic cylinder. The pneumatic ram will automatically reset when the press is opened and recycled.

Alternatively, the bolster assembly 70 may be utilized to avoid overhit conditions, relying upon the setting of the press to avoid an underhit condition. In this mode of operation, the pressure in the chamber 88 is set at slightly less than the maximum preferred pressure and the plunger 36 is adapted to install a pierce nut 44 with each stroke of the press at the preferred installation pressure. When the tonage of the press exceeds the preferred range, the plunger 36 will be forced upwardly against the ram 90 of the pneumatic cylinder. The pneumatic cylinder will then move upwardly, releasing the pressure on the plunger and avoiding an overhit condition. FIG. 4 illustrates the range of movement of the plunger and ram. As described above, the shoulder 98 first engages the upper end of the nose piece 40, as shown in FIG. 3, interlocking the housing members. The upward movement of the ram 90 permits the plunger 36 to move upwardly and the nose piece 40 follows as shown in FIG. 4. Finally, the nose piece 40 of the lower housing member engages the upper housing member 32 limiting any further relative movement and providing a second stop means.

In the disclosed embodiment, the ram 90 of the pneumatic cylinder has a one inch stroke. A nitrogen cylinder of this type may be purchased from Forward Industries of Dearborn, Michigan, Model No. FH-6. Similar nitrogen cylinders are commercially available from Teledyne-Hyson, a division of Teledyne Inc. In the disclosed embodiment, the pressure chamber 88 is relatively large, permitting the ram 90 to retract in a step function or constant spring rate. A source of pneumatic pressure 110 charges the chamber 88 through line 112, as shown in FIG. 2. A pressure release 114 may be provided in a conventional two-way valve 116. In its simplest form, the chamber 88 is simply charged with a predetermined pressure. For example, the described nitrogen cylinder of Forward Industries has a maximum pressure of 1,850 psi. In a typical application, the cylinder may be charged with about 1,300 psi, providing a fastener installation force of about 4.5 tons. When the installation pressure exceeds approximately 5.5 tons, the ram 90 is forced upwardly, releasing the plunger and avoiding an overhit condition. It will be understood that it is also possible to use a hydraulic system which will provide a more sensitive press system, however hydraulic fluid can not be compressed and a hydraulic release system must be provided. In the present disclosure, the release means is provided by the pneumatic chamber 88, which permits the enlarged piston head 92 to extend into the chamber when the predetermined maximum pressure is exceeded.

As described above, the installation head and bolster assembly of this invention may be utilized to install various fasteners, including male fasteners, such as bolts, and various female fasteners. The bolster assembly may also be utilized for installing discrete or individual nuts as disclosed in the above referenced United States Patents. Further, the disclosed fastener installation head may be utilized to install conventional universal pierce nuts, as disclosed in U.S. Pat. No. 3,152,628, and pierce nuts in relatively thick or heavy gage panels, as disclosed in U.S. Pat. No. 3,878,598.

We claim:

1. A fastener installation head and bolster assembly located in a reciprocal press having opposed platens, said installation head including an elongated plunger and a relatively movable housing member having a plunger passage receiving said plunger therethrough, said plunger operably supported on one of said press platens, a die member supported on the opposed press platen opposite said housing member plunger passage for installing a fastener in a structural member located on said die member upon closing of said press platens, said housing member first engaging said structural member as the press is closed and said plunger then moving through said plunger passage to install a fastener located beneath said plunger in said structural member, said bolster assembly including a fluid pressure ram generally coaxially aligned with and operably engaging said plunger located between said plunger and said press platen, fluid pressure means maintaining a constant predetermined fluid pressure on said ram, a stop means limiting the longitudinal movement of said elongated plunger relative to said housing member, then interlocking said plunger and said housing member when said plunger has extended through said housing member and installed a fastener in said structural member, and a release means releasing said ram when the force on said plunger exceeds a predetermined fastener installation pressure.

2. The fastener installation head and bolster assembly defined in claim 1, characterized in that said ram has an enlarged head portion located in a fluid pressure chamber in said bolster assembly, said fluid pressure means maintaining said predetermined fluid pressure in said fluid pressure chamber.

3. The fastener installation head and bolster assembly defined in claim 2, characterized in that said fluid pressure means is pneumatic.

4. The fastener installation head and bolster assembly defined in claim 1, characterized in that said plunger includes a rectangular end portion and said housing member plunger passage is rectangular and configured to closely receive said plunger and a rectangular fastener, said plunger having an enlarged shoulder spaced from said rectangular end portion which engages said housing member, providing said stop means and limiting the longitudinal movement of said plunger in said housing member passage.

5. The fastener installation head and bolster assembly defined in claim 4, characterized in that said housing member includes a transverse passage communicating with said plunger passage receiving fasteners for installation by said installation head, said plunger reciprocating through said plunger passage and installing fasteners received from said transverse passage through said plunger passage and a second stop means limiting the relative movement of said fluid pressure ram.

6. The fastener installation head and bolster assembly defined in claim 1, characterized in that said plunger is supported against said ram to extend beyond the preferred fastener installation position, said plunger engaging a fastener and exceeding the preferred installation force with each stroke of the press, said fluid ram then releasing said plunger and said ram and said plunger then recycling to a ready installation position upon opening of said press.

7. A fastener installation head and bolster assembly located in a reciprocal press having opposed platens, said installation head including an elongated plunger member and a relatively movable housing having a plunger passage receiving said plunger member therethrough, said plunger member operably supported on one of said press platens, a die member supported on the opposed press platen opposite said housing plunger passage for installing a fastener in a structural element located on said die member upon closing of said press platens, said housing first engaging said structural element as the press is closed and said plunger member then moving through said plunger passage to install a fastener located beneath said plunger member in said structural element, said bolster assembly including a fluid pressure ram coaxially aligned with said plunger and die members, said fluid pressure ram operably supporting said plunger and die members during fastener installation located between one of said members and the supporting press platen, fluid pressure means maintaining a constant predetermined fluid pressure on said ram, a stop means limiting the longitudinal movement of said elongated plunger member relative to said housing, then interlocking said plunger member and said housing when the plunger member has extended through said housing and installed a fastener in said structural element, and a release means releasing said ram when the force on said plunger and die members exceeds a predetermined fastener installation pressure.

8. The fastener installation head and bolster assembly defined in claim 7, characterized in that said fluid pressure means is pneumatic and said ram having an enlarged head portion located in a gas fluid pressure in said bolster assembly, the gas pressure of said fluid pressure means maintaining said predetermined fluid pressure in said chamber and said ram extending into said chamber when the force on said plunger and die members exceed said predetermined fastener installation pressure.

9. A fastener installation head and bolster assembly, said installation head including a first housing member having a relatively fixed elongated plunger extending therefrom, a second relatively movable housing member having a first passage receiving fasteners to be installed by the installation head and a second transverse passage extending through said second housing member communicating with said first passage and receiving said plunger, said first housing member operably supported on a reciprocating die means, said die means reciprocating said first housing member and said plunger through said second passage of said second housing member, said die means providing the installation force for installing a fastener engaged by said plunger in a structural member located opposite said second passage, said die means first moving said second housing member into engagement with said structural member, continued movement of said die means then moving said plunger through said second passage to engage a fastener received from said first passage and then moving said fastener into fastening engagement with said structural member, said bolster assembly having a fluid supported ram supporting said fastener installation head plunger between plunger and said die means, fluid pressure means maintaining a predetermined fluid pressure on said ram, release means releasing said ram when the ram pressure exceeds said predetermined fluid pressure, a first stop means limiting said relative movement of said second housing member and interlocking said housing members when said plunger extends through said second housing member and installs a fastener in said structural member, said release means then adapted to release said ram and the supported plunger when the fastener installation force exceeds said predetermined fluid pressure.

10. The fastener installation head and bolster assembly defined in claim 9, characterized in that said plunger and ram are generally coaxially aligned and operably engaged and said ram having an enlarged head portion located in a fluid pressure chamber in said bolster assembly, said fluid pressure means maintaining a predetermined fluid pressure in said fluid pressure chamber.

11. The fastener installation head and bolster assembly defined in claim 10, characterized in that said fluid pressure means is pneumatic.

12. The fastener installation head and bolster assembly defined in claim 9, characterized in that said plunger has an enlarged shoulder spaced from the end portion which is received in said second passage of said second housing member, said shoulder engaging said second housing member and providing said stop means limiting relative movement of said second housing member.

* * * * *